United States Patent [19]

Martin et al.

[11] 4,341,668

[45] Jul. 27, 1982

[54] AQUEOUS COMPOSITION CONTAINING ALDEHYDE CONDENSATE AND USE THEREOF

[75] Inventors: Jeffrey E. Martin, Columbus; Albert F. Vozella, Worthington; Golden F. Watts, Delaware; Edwin R. Luckman, Columbus, all of Ohio

[73] Assignee: Ashland Oil, Inc., Ashland, Ky.

[21] Appl. No.: 187,692

[22] Filed: Sep. 16, 1980

[51] Int. Cl.$^3$ .................. C08L 89/02; C08L 61/06
[52] U.S. Cl. ............................ 524/297; 524/296; 524/704; 524/502; 524/507; 524/510; 524/541; 524/361; 524/376; 524/378; 524/595
[58] Field of Search ......... 260/29.3, 29.4 R, 29.2 TN, 260/29.6 NR, 7; 525/58

[56] References Cited

U.S. PATENT DOCUMENTS

| | | | |
|---|---|---|---|
| 3,931,088 | 1/1976 | Sakurada et al. | 260/29.6 RB |
| 4,110,277 | 8/1978 | Economy et al. | 260/841 |
| 4,128,695 | 12/1978 | Kikuchi et al. | 428/424.8 |
| 4,179,427 | 12/1979 | Gardikes | 260/29.2 TN |

FOREIGN PATENT DOCUMENTS 50-69138  6/1975  Japan .
50-69142  6/1975  Japan .

*Primary Examiner*—Theodore E. Pertilla
*Attorney, Agent, or Firm*—Pollock, Vande Sande & Priddy

[57] ABSTRACT

A composition containing a methylene donor, hydrophobic component containing an organic hydrophobic diluent and an isocyanate; and an aqueous component containing a water compatible aldehyde condensate and use thereof as an impregnant or bonding agent for cellulosic materials including paper, wood and cotton, and/or fibrous materials including synthetic fibers, such as rayon and nylon.

41 Claims, No Drawings

AQUEOUS COMPOSITION CONTAINING ALDEHYDE CONDENSATE AND USE THEREOF

DESCRIPTION

1. Technical Field

The present invention is concerned with compositions containing a hydrophobic component containing an isocyanate compound and an aqueous component containing an aldehyde condensate. Moreover, the present invention is concerned with the use of such water containing compositions for impregnating and bonding cellulosic materials such as paper, wood and cotton, and fibrous materials including synthetic fibers, such as nylon and rayon.

2. Background Art

After paper is formed, it is usually saturated with a thermoset polymer composition such as a phenolic-aldehyde condensate. Saturation places the resinous material in the interstices of the paper. It has been suggested that phenolic-aldehyde condensates are chemically reactive with hydroxyl groups in cellulosics to provide strength and protection for the fibers. Since melamine and urea aldehyde condensates contain methylol groups similar to those in phenolic-aldehyde condensates, it is believed that melamine- and urea-formaldehyde condensates chemically react similarly to phenolic-aldehyde condensates. However, the final properties of the paper will differ.

Paper saturated with an aldehyde condensate is partially heat cured or "B" staged to react only some of the methylol groups together and to tie in partially with the hydroxyl groups of the cellulosic papers; thereby, adding some physical strength to the paper. Grooving or corrugating is generally done at this point to provide additional strength in final use. The paper is then rolled and shipped to the users, who pleat, fold or otherwise distort the flat rolled paper.

Pleating is accomplished before final cure. If the cure were completed prior to pleating, the embrittlement of the paper would cause fractures and subsequent loss of strength at the folds and filtration efficiency would be sacrificed or the filter could collapse in use.

Fuel costs and environmental considerations have prompted some end paper users to buy the paper in more fully cured stages with the contained resins being modified to provide "pseudo-thermoplastics." These saturated papers require minimum heat to soften while pleating. This heating advances the cure of the modified resins minimally. Application of plastisols, which are used as adhesives, on the end caps of filters advance the resins to a greater extent as the plastisols are cured with heat.

Filter manufacturers that have perfected such system usage have substantially reduced their own heating and environmental compliance costs. The paper saturators, on the other hand, are being faced with using more fuel and emitting more volatile organic compounds (VOC) than previously encountered. Conversion to alcohol soluble, low emissions resins has cut smoke emissions from phenol, but new regulations in most areas have brought about concern about alcohol emissions. Under certain VOC regulations, limits on a yearly basis have been set in some states for emissions for each individual manufacturing location.

These VOC regulations force paper makers and saturators to either burn the alcohol vapors or consider non-organic solvent systems (water). Additional fuel is used without benefit in the case of burning vapors unless large capital expenditures are made, wherein, heat generated from vapor burning is used to replace heat costs encountered in paper making and "B" staging the saturated paper. Water solvent systems eliminating these capital investments are very attractive.

Another area where water solvent systems would be very attractive is in the production of carpet backing and sound deadening insulation, such as from non-woven cotton fabrics. For instance, in the production of carpet backing such as for automobiles, where sound deadening and insulation from excess heat and/or cold is required, non-woven cellulosic fabric (e.g. cotton) is garnetted into a mat using phenolic powder as the adhesive between the layers of the garnet. The use of a powder leaves much to be desired concerning handling of materials and waste. The mat is cured for about 30 seconds using elevated temperatures on both sides so that the mat is easily handled. The mat is then subjected to a heat mold/die cut machine for forming the product. At this stage, it is completely cured. The ability to employ a water system in place of the powder would be advantageous.

In addition, water systems which contain a hydrophobic component containing an isocyanate compound and an aqueous portion containing certain polymers reactive therewith have been previously suggested. The isocyanate component is present along with a hydrophobic solvent in order to retard the reaction between the isocyanate and aqueous component while the composition is in the liquid form. The hydrophobic solvent is employed to protect the isocyanate from premature reaction. Examples of some suggested compositions which employ such a system can be found in U.S. Pat. Nos. 3,931,088 and 4,128,695.

DESCRIPTION OF INVENTION

It is therefore an object of the present invention to provide an aqueous composition which can be used to impregnate and bond cellulosic and/or fibrous materials such as paper, wood, cotton, nylon, rayon and mixtures thereof, and which can be applied and cured with minimal energy requirements.

The present invention is concerned with a composition which comprises a compound capable of providing reactive methylene sites at elevated temperatures; a hydrophobic component containing an organic hydrophobic diluent and an isocyanate and an aqueous component containing a water compatible aldehyde condensate having free methylol groups.

The present invention is also concerned with substrates impregnated and/or bonded with the above-defined composition and the process of coating cellulosic substrates and fibrous materials with the above-defined composition.

BEST AND VARIOUS MODES FOR CARRYING OUT INVENTION

According to the present invention, the compositions include a hydrophobic component which contains an isocyanate. The isocyanate compound and/or polymer thereof is a molecule which has two or more isocyanate groups, such as toluene-diisocyanate, hydrogenated toluene-diisocyanate, trimethylolpropane-toluene-diisocyanate adduct, triphenylmethane-triisocyanate, methylene-bis-diphenylisocyanate, hydrogenated methylene-bis-diphenylisocyanate, hexamethylene-diisocyanate, xylene-diisocyanate, 4,4'-dicyclohexyl-methane-diisocyanate, and polymeric MDI (i.e. polymeric methylenebisphenyl-diisocyanate) such as those commercially available under the trade designations PAPI and Mondur MR.

Moreover, a mixture of a polyisocyanate and a polyol, for example, a mixture of polyols, such as polyester or polyether with hydroxyl groups, and an excess of isocyanate can be employed if desired.

Furthermore, it is possible to employ a prepolymer system, such as a prepolymer with NCO end groups, partially polymerized from a polyol and an excess of polyisocyanate, or a prepolymer with OH end groups, partially polymerized from an excess of polyol, mixing it with an excess of one of the above-mentioned isocyanates. Mixtures of isocyanates can be employed when desired.

The hydrophobic diluent employed in the hydrophobic component according to the present invention preferably dissolves the isocyanate compound or polymer and is liquid at normal room temperatures. The solubility of the diluent in water and the solubility of water in the diluent should preferably be below about 5 weight percent at temperatures between 20° to 30° C.

Some typical examples of suitable hydrophobic diluents include aliphatic, cycloaliphatic, or aromatic hydrocarbons or mixtures thereof as the main component. Some hydrocarbons include toluene, xylene, benzene, gasoline, kerosene, ligroin, tetralin, decalin, terpentine oil, pine oil, liquid paraffin, and alkyl benzene. In addition, other diluents include halogenated hydrocarbons, such as methylene chloride, 1,1,1-trichloroethane, chlorobenzene, chlorotoluene, bromobenzene, and chlorinated paraffins; ketones, such as methyl-isobutyl ketone, methyl-n-amyl ketone, methyl-n-hexyl ketone, ethyl-n-butyl ketone, di-n-propyl ketone and acetophenone; ethers, such as isopropyl ether, methylphenyl ether, ethyl-benzyl ether, and furan; lower aliphatic esters, such as isopropyl acetate, amyl acetate, butyl acetate and butyl propionate; phthalic acid diesters, such as dibutyl phthalate, dioctyl phthalate, and butylbenzyl phthalate; oleic acid esters; adipic acid esters; azelaic acid esters, sebacic acid esters, stearic acid esters, benzoic acid esters, abietic acid esters, oxalic acid esters, and phosphoric acid esters. Moreover, oils obtained mainly from higher aliphatic acid esters, such as caster oil, can be employed if desired. Mixtures of diluents can be employed if desired.

It is important to note that the hydrophobic diluent should not have amounts of active hydrogen groups, such as carboxy-, hydroxy-, or amino-groups in the molecule, such that upon mixing with the isocyanate compound or polymer it readily reacts therewith resulting in a significant decrease in the concentration of active isocyanate groups available.

The isocyanate compound and/or polymer is employed in amounts of about 1 to about 99% by weight, preferably about 10 to about 99% by weight, and most preferably about 50 to about 90% by weight based upon the total amount of isocyanate and hydrophobic diluent employed.

The term "protected isocyanate" when employed in the present specification refers to the combination of the isocyanate and hydrophobic diluent of the type discussed hereinabove.

The aqueous component of the compositions of the present invention includes an aldehyde condensate. The aldehyde condensate is preferably a urea-, or melamine- or most preferably a phenolic-aldehyde condensate. Mixtures of such aldehyde condensates can be employed when desired. The aldehyde condensates are preferably heat reactive and are water soluble and/or water dilutable. The aldehyde condensates employed in accordance with the present invention are methylol containing materials with at least some available sites filled as methylols and some reactive sites available for subsequent crosslinking via methylene addition during the pleating operation (heat applied).

Examples of phenols which can be employed in preparing the phenolic-aldehyde condensates to be used in the present invention include phenol and substituted phenols.

Substituted phenols employed in the formation of the phenolic polymers include: alkyl-substituted phenols, aryl-substituted phenols, cyclo-alkyl-substituted phenols, alkenyl-substituted phenols, alkoxy-substituted phenols, aryloxy-substituted phenols, hydroxy-substituted phenols, and halogen-substituted phenols, the foregoing hydrocarbon substituents containing from 1 to 26, and preferably from 1 to 9 carbon atoms. Specific examples of suitable phenols include: phenol, resorcinol, catechol, hydroquinone, 2,6-xylenol, o-cresol, m-cresol, p-cresol, 3,5-xylenol, 3-4-xylenol, 2,3,4-trimethyl phenol, 3-ethyl phenol, 3,5-diethyl phenol, p-tertbutyl phenol, 3,5-dibutyl phenol, p-amyl phenol, p-cyclohexyl phenol, p-octyl phenol, 3,5-dicyclohexyl phenol, o-phenyl phenol, p-crotyl phenol, nonyl phenol, p-phenyl phenol, 3,5-dimethoxy phenol, 3,4,5-trimethoxy phenol, p-ethoxy phenol, p-butoxy phenol, 3-methyl-4-methoxy phenol, and p-phenoxy phenol. In addition, phenols containing multiple phenolic rings, such as bis-phenol-A, can be employed. Mixtures of phenols can be used when desired.

The preferred aldehyde employed is formaldehyde. Such can be in aqueous solution or any of its low polymeric forms, such as paraform or trioxane. The aldehydes preferably contain 1 to 8 carbon atoms, examples of which include acetaldehyde, propionaldehyde, butyraldehyde, benzaldehyde, furfural, 2-ethylhexanal, ethylbutyraldehyde, heptaldehyde, pentaerythrose, glyoxal, chloral, and the like. Mixtures of aldehydes can be used when desired.

The preferred phenolic-aldehyde condensates employed according to the present invention are water soluble and/or water dilutable and are obtained from about 0.75 moles of aldehyde to about 3.3 moles of aldehyde per mole of phenolic compound, and preferably at least about 0.95 to about 3 moles and most preferably about 1.5 to about 2.5 moles of aldehyde per mole of phenolic compound. In addition, the preferred phenolic-aldehyde condensates are prepared under basic conditions which employ about 0.25 to 4%, and preferably about 0.75 to 2.5% by weight of a basic material, such as a metallic oxide or hydroxide, ammonium hydroxide or basic amine based upon the amount of phenol present. Examples of some suitable metallic oxides and hydroxides include alkali metal and alkaline earth metal oxides and hydroxides, such as sodium hydroxide, potassium hydroxide and lithium hydroxide. Examples of some suitable basic amines include triethyl amine and triethanol amine. The most preferred phenolic-aldehyde polymers employed according to the present invention contain from about 3 to about 5% by weight of free phenol and a pH of about 8.5 to about 9.0. Mixtures of phenolic-aldehyde polymers can be employed when desired.

A typical process for preparing the phenolic-aldehyde condensates include condensing at about 60°-105° C. until the aldehyde is substantially consumed. It may be desirable to carry out the process in the presence of casein such as in amounts from about 0.5 to about 10% by weight based upon the weight of the phenol employed in the process.

The preferred phenolic-aldehyde condensates employed in the present invention have a pH of at least about 8 and most preferably at least about 8.3. The use of these preferred aldehyde condensates provide for compositions having a high degree of stability and shelf life.

The compositions of the present invention also include a compound capable of providing reactive methylene sites at elevated temperatures. The methylene donors are essentially non-reactive at normal room temperatures but provide reactive methylene groups at elevated temperatures such as at about 135° C. and above. Examples of some specific methylene donors include hexamethylene tetraamine and trimethylol nitromethane. Mixtures of methylene donors can be employed when desired. The methylene donors are preferably water soluble or water compatible and present in the aqueous component of the composition. The amount of methylene donor is usually about 1 to about 20% by weight and preferably about 5 to about 10% by weight based upon the total amount of aldehyde condensate present in the composition.

The aqueous component of the compositions of the present invention can also contain polymers in addition to the aldehyde condensate. This additional polymer is water soluble or water dispersible. The additional polymer can be non-reactive or preferably contain at least one group which is reactive with the isocyanate, such as reactive hydrogen groups including hydroxyl, carboxyl, amine and amide groups. Examples of some suitable polymers containing groups reactive with the isocyanate are synthetic water dispersible polyesters obtained from polyhydric alcohols, such as propylene glycol and polypropylene glycol and polycarboxylic acid such as adipic acid; and homopolymers or copolymers (from two or more monomers) from monomers containing ethylenically unsaturated groups. For instance, those polymers suggested in U.S. Pat. No. 3,931,088 are quite suitable for the purposes of the present invention.

Examples of some suitable ethylenically unsaturated monomers with groups reactive with isocyanates to be employed in the polymer include dimethylaminoethylmethacrylate, 2-hydroxyethylacrylate, 2-hydroxyethylmethacrylate, hydroxypropylmethacrylate, ethyleneglycoldimethacrylate, hydroxypropylacrylate, N-isobutoxy methylacrylamide, acrylamide, methacrylamide, allyl alcohol, acrylic acid, methacrylic acid, maleic acid, fumaric acid, crotonic acid, and maleic anhydride. In addition, examples of some suitable copolymers containing N-methylol functional derivative of an allyl carbamate etherified with a $C_1$-$C_8$ alcohol can be found in U.S. Pat. No. 3,941,735 to Lindemann.

The reactive groups can be provided in the monomer and/or the polymer by treatment subsequent to and/or concurrent with the polymerization of the monomers. For instance, polymers from vinyl acetate can be treated by saponification to provide reactive hydroxyl groups to provide polyvinyl alcohol. Also, the glycidylacrylate and glycidylmethacrylate can be converted to hydroxyl groups for reaction with the isocyanate.

Examples of some suitable ethylenically unsaturated monomers to be employed in the polymer but which do not contain groups reactive with the isocyanate include acrylate and methacrylate monomers, such as methylacrylate, ethylacrylate, butylacrylate, methylmethacrylate, ethylmethacrylate, butylmethacrylate, and 2-ethylhexyl acrylate; ethylene; propylene; styrene; methyl styrene; divinyl benzene; butadiene; and vinyl esters such as vinylacetate, vinylpropionate, and vinyl versatate. Mixtures of polymers can be employed when desired.

The polymers reactive with the isocyanate generally contain an average of at least about two reactive functionalities per polymer chain.

The presence of the additional polymer and especially the polymers which contain at least one group reactive with the isocyanate provide for enhanced physical strength characteristics. Those compositions which contain an additional polymer which contain at least one group reactive with the isocyanate are preferred.

The term "polymer component which contains groups reactive with the isocyanate" or similar terms refers to the entire additional polymer component of the aqueous phase wherein at least one of the polymers contains at least one group reactive with the isocyanate. Accordingly, said term can encompass a mixture which also includes polymers which do not have groups reactive with the isocyanate.

The compositions of the present invention can include auxiliary agents such as compounds known to catalyze isocyanate reactions in common urethane reactions. Examples of urethane catalysts include amines, divalent metal salts, alkali and alkaline earth oxides and hydroxides. The preferred urethane catalysts employed according to the present invention are tertiary amines. Those compositions which contain an additional polymer containing at least one group reactive with the isocyanate and a tertiary amine have enhanced stability and shelf-life when compared to such compositions which do not contain a tertiary amine.

The tertiary amines which are employed according to a preferred aspect of the present invention are those which are generally deemed to be catalysts for isocyanate reactions, and preferably tertiary amines including the alkanol amines and alkyl amines wherein the alkanol and/or alkyl groups generally each contain 1 to 5 carbon atoms.

The amines generally have up to about 20 carbon atoms. Examples of suitable amines include trialkyl amines such as trimethylamine and triethylamine; triethanolamine; dimethylethanolamine; diethylenetriamine; tetramethyl butane diamine; N-methyldipropylene triamine; N-diethylamino acetic acid; methylamino propionic acid; pyridine; substituted pyridines; N-alkyl morpholine compounds such as N-methyl morpholine; other substituted morpholine compounds such as N-acetyl morpholine and 4,4'-dithio morpholine; quiniline; isoquiniline; tetra-methylguanidine; cyclohexyl dimethylamine; and dimethyl aniline.

The compositions of the present invention generally contain about 5 to about 97.5% by weight, and preferably about 10 to about 60% by weight of the aldehyde condensate; about 2 to about 75% by weight, preferably about 5% to about 40% by weight and more preferably about 5 to about 25% by weight of the isocyanate compound and/or prepolymer. The above amounts of materials are based upon the total of the aldehyde condensate, isocyanate, and methylene donor present in the composition. The amount of methylene donor is about 1 to about 20% by weight and preferably about 5 to about 10% by weight based upon the aldehyde condensate.

With respect to those compositions of the present invention which contain one or more of the above-discussed additional polymers, such, in addition to the above-discussed amounts of methylene donor, generally contain from about 5 to about 50% by weight, and preferably about 10 to about 30% by weight of the aldehyde condensate; about 2 to about 75% by weight, preferably about 5 to about 40% by weight, and more preferably about 5 to about 25% by weight of the isocyanate compound and/or prepolymer; about 25 to about 93% by weight, preferably about 50 to about 85% by weight, and more preferably about 70 to about 85% by weight of the above-discussed polymer in addition to the aldehyde condensate; and when present from about 0.1 to about 10% by weight, preferably about 0.1 to about 4% by weight, and more preferably about 0.1 to about 2% by weight of the tertiary amine. The above amounts of materials are based upon the total of the aldehyde condensate, isocyanate, additional polymer, and tertiary amine present in the composition.

The compositions of the present invention generally contain from about 10 to about 74% by volume of nonvolatiles, preferably about 30 to about 60% by volume, and more preferably about 35 to about 55% by volume of nonvolatiles based upon the total volume of the composition. The isocyanate compound and/or polymer is employed in amounts of about 1 to about 99% by weight, preferably about 10 to about 90% by weight, and more preferably about 50 to about 90% by weight based upon the total amount of isocyanate and hydrophobic diluent employed in the composition. As apparent, the remainder of the composition after taking into account the amount of nonvolatile component and the amount of organic diluent is the water.

In addition, the compositions can include auxiliary agents such as surface-active agents, water soluble oligomers, and fillers. The surface-active agent can be introduced to the compositions due to its use in the preparation of any of the polymers employed. The surface active agents can be anionic, cationic or nonionic surface active agents. Examples of some anionic surfactants include carboxylic acid salts such as salts of aliphatic carboxylic acids; alkyl sulfates and sulfonates; alkyl benzene sulfonates; alkyl naphthalene sulfonates; lignin sulfonates; and alkyl benzene sulfonates, alkyl naphthalene sulfonates, and the like; phosphonic ester salts such as phosphonic acid esters of higher fatty acids, and the like. The concentration of the surface-active agent when employed is usually about 0.1 to about 10 weight percent, and more preferably about 0.2 to about 5 weight percent based upon the weight of the polymers present in the aqueous component of the composition.

Suitable fillers include organic substances such as wood powder and powder of walnut shell, as well as inorganic substances, such as clay, kaolin, silica, calcium carbonate, and talc.

The amount of filler, if employed, is generally about 10 to about 50 volume percent based upon the total nonvolatiles of the composition.

The preferred compositions of the present invention are substantially, if not completely free from acid catalysts. The aqueous component can be a solution, emulsion, or suspension, or combination thereof.

The compositions of the present invention are preferably prepared by adding the methylene donor prior to the incorporation of the isocyanate portion of the composition. However, any sequence of addition of the components can be carried out. Also, the compositions are preferably prepared by adding the amine when present prior to the incorporation of the isocyanate portion of the composition. When the composition contains one or more of said additional polymers having groups reactive with the isocyanate, for improved stability characteristics, the preferred method of admixing provides for improved stability characteristics when said additional polymer having groups reactive with the isocyanate is present and includes admixing the polymer reactive with the isocyanate followed by the amine followed by the aldehyde condensate, followed by the methylene donor and then the isocyanate portion or admixing the polymer reactive with the isocyanate to which is added the aldehyde condensate followed by the amine and methylene donor and then the isocyanate portion.

In addition, the compositions should be prepared by low speed or low shear mixing conditions, since high shear type mixing tends to shorten the pot life of the composition. It has been noted that the finer particle dispersions result in shorter pot life. Accordingly, a mild agitation is normally employed to form the mixtures of the present invention.

The compositions can be subjected to an initial partial cure treatment which is usually carried out at room temperature to about 121° C. for about 5 minutes to about 24 hours. The composition because of the presence of the methylene donor can be post cured such as by heating at 135° C. to about 232° C. for about 1 minute to about 15 minutes. The time and temperature up to above cure treatments are inversely related. That is, as the temperature increases, the time needed for cure decreases and vice versa.

The compositions of the present invention are particularly suitable for bonding and impregnating cellulosic materials and/or fibrous materials such as paper including filter papers, such as oil filter paper, industrial air filter paper and railroad filter paper; wood; cotton, including waste cotton fibers; nylon; and rayon.

The following non-limiting examples are presented to further illustrate the present invention wherein all parts are by weight unless the contrary is stated.

EXAMPLE 1

To about 100 parts by weight of a polymer aqueous emulsion of about 35% solids are added with a slow speed mixing about 6.8 parts by weight of a heat reactive water dispersible aqueous phenol-formaldehyde polymer with 50% solids; about 1 part by weight of triethylamine, about 0.3 parts by weight of hexamethylene-tetraamine, and about 3.4 parts by weight of a protective polyisocyanate containing about 75% by weight of a polymeric methylene diphenyl diisocyanate (MDI), about 12.5% by weight of toluene, and about 12.5% by weight of dibutylphthalate. The aqueous polymer emulsion is obtained from about 43.04 parts by weight of Vinol 523, about 9.56 parts by weight of Vinol 425, about 693.08 parts by weight of Airflex 400, about 0.48 parts by weight of Dowcil 75, and sufficient water to provide a solids content of about 34%. Vinol 523 is a polyvinyl alcohol commercially available from Air Products and Chemicals, Inc., and, according to the manufacturer, is about 87 to about 89% hydrolyzed, has a pH of about 5 to 7 as measured in a 4% aqueous solution, and a viscosity of about 21 to about 25 centipoise as measured in a 4% aqueous solution at 20° C. Vinol 425 is available from Air Products and Chemicals, Inc. and, according to the manufacturer, is a polyvinyl alcohol hydrolyzed to about 95.5 to 96.5%, has a pH of about 5 to 7 as measured in a 4% aqueous solution, and a viscosity of about 26 to 30 centipoise as measured in a 4% aqueous solution at 20° C. Airflex 400 is commercially available from Air Products and Chemicals, Inc. and is an aqueous solution emulsion of a co-polymer ethylene and vinyl acetate and, according to the manufacturer, has a minimum solids of about 55%, a Brookfield viscosity at 60 rpm and 77° F. of about 1400 to about 2000 centipoise, and a Brookfield viscosity at 20 rpm and 77° F. of about 1900 to about 2800 centipoise, a pH of about 4.0 to about 5.0, and contain as protective colloid partially acetylated polyvinyl alcohol. A further discussion of Airflex 400 can be found in a publication from Air Products and Chemicals, Inc. entitled "Air Flex 400 Base for Adhesives", Bulletin 151-919, disclosure of which is incorporated herein by reference. Dowcil 75 is available from the Dow Chemical Company and, according to the manufacturer, is 1-(3-chloroallyl)-3,5,7-triaza-1-azoniaadamantane chloride containing a sodium bicarbonate stabilizer. Dowcil 75 is a preservative used in adhesives.

The phenol-formaldehyde condensate is prepared from formaldehyde and phenol in a mole ratio of about 1.8:1; employing about 35.2 parts by weight of phenol, about 2.1 parts by weight of 50% aqueous sodium hydroxide, about 15.5 parts by weight of water, about 3.4 parts by weight methanol, about 41.7 parts by weight of 50% formaldehyde, and about 0.09 parts by weight of 29% aqueous ammonia at a pH of about 8.5. The phenol-formaldehyde has about 4% free phenol.

Automotive oil filter paper is treated with the above composition to provide about 18 to 22% polymer pickup when cured at about 121° C. for about 15 minutes. The treated paper is partially cured by heating for 5 minutes at about 177° C. The treated paper is then conditioned for 4 hours at about 77° F. and 50% relative humidity before being tested. The tests performed are for Mullen burst strength, tensile strength, and Gurley stiffness values. The Mullen burst strength is about 43.0 psi, the tensile strength about 27.4 lbs/inch, and the Gurley stiffness MD (machine direction) about 4445 mg and Gurley stiffness XD (cross direction) about 2756 mg.

Prior to post curing, the Mullen burst strength is about 44.6 psi, the tensile strength about 26.4 lbs/inch, the Gurley stiffness MD is about 3512 mg and the Gurley stiffness XD is about 2400 mg. After 68 hours at 200° F. in 10W-40W multigrade oil, the Mullen burst strength is 40.1 psi, the tensile strength is about 25 lbs/inch, the Gurley stiffness MD is about 5218 mg, and the Gurley stiffness XD is about 3256 mg.

COMPARISON EXAMPLE 2

Example 1 is repeated except that the composition does not contain a methylene donor, and accordingly, is not subjected to post curing. The Mullen burst strength is about 44.5 psi, the tensile strength is about 28.8 lbs/inch, the Gurley stiffness MD about 2845 mg and the Gurley stiffness XD about 1556 mg. After 68 hours at 250° F. in 10W-40W multigrade oil, the Mullen burst strength is 42.5 psi, the tensile strength is 27.5 lbs/inch, the Gurley stiffness MD is 2534 mg and the Gurley stiffness XD is 1512 mg.

A comparison of Examples 1 and 2 illustrates the significant improvement in stiffness achieved by employing a methylene donor which renders the treated paper practical for use as an oil filter. The burst strength and tensile strength when employing the methylene donor were only reduced slightly.

EXAMPLE 3

To about 100 parts by weight of a polymer aqueous emulsion obtained by admixing about 181.5 parts of water, about 3.5 parts of hexametaphosphate; about 1.35 parts of tributylphosphate; about 3.10 parts of 80 micron calcium carbonate (Gamma sphere 80); about 19 parts of a 15% aqueous polyvinyl alcohol available under the trade designation PBA-EST; about 61 parts of a heat-reactive water-dispersible aqueous phenol-formaldehyde polymer with 50% solids; about 396 parts of a noncarboxylated butadiene-styrene polymeric latex available under the trade designation Dow SBR Latex XD 30485; about 13.2 parts of toluene; about 1.2 parts of Dowacil 75; and about 5 parts of a hydroxymethyl cellulose available under the trade designation Carbopol are added about 5 parts of a 50% aqueous solution of hexamethylenetetraamine and about 20 parts of a protective polyisocyanate containing about 75% by weight of a polymeric methylene diphenyl diisocyanate (MDI), about 12.5% by weight of toluene, and about 12.5% by weight of dibutylphthalate. The PBA-EST is similar to Vinol 425 employed in Examples 1 and 2 above and is a polyvinyl alcohol hydrolyzed to about 95.5 to 96.5%, has a pH of about 5 to 7 as measured in a 4% aqueous solution, and a viscosity of about 26 to 30 centipoise as measured in a 4% aqueous solution at 20° C.

Dowcil 75 is available from the Dow Chemical Company and, according to the manufacturer, is 1-(3-chloroallyl)-3,5,7-triaza-1-azoniaadamantane chloride containing a sodium bicarbonate stabilizer. Dowcil 75 is a preservative used in adhesives.

The phenol-formaldehyde condensate is prepared from formaldehyde and phenol in a mole ratio of about 1.8:1; employing about 35.2 parts by weight of phenol, about 2.1 parts by weight of 50% aqueous sodium hydroxide, about 15.5 parts by weight of water, about 3.4 parts by weight methanol, about 41.7 parts by weight of 50% formaldehyde, and about 0.9 parts by weight of 29% aqueous ammonia at a pH of about 8.5. The phenol-formaldehyde has about 5% free phenol.

The composition is applied to one surface at 60 lbs/100 sq. ft. via brushing and two surfaces of two pieces of Ponderosa Pine wood are bonded together under 125-150 psi for 16 hours. The composition is then post cured for 10 minutes at 325° F. The laminate is then subjected to 4 hours boiling water and dried overnight in a forced air oven at 60° C. It is then subjected to boiling water for another 4 hours.

Then it is cooled with ambient water and tested wet to determine tensile-shear strength, according to ASTM 3110. The tensile-shear strength is 376 psi with 35% wood failure.

COMPARISON EXAMPLE 4

Example 3 is repeated except that the composition does not contain a methylene donor and, accordingly, is not subjected to post curing.

When subjected to the boil dry testing according to ASTM 3110, the tensile-strength is 328 with 25% wood failure.

We claim:

1. A composition comprising a compound capable of providing reactive methylene sites at elevated temperature of about 135° C. and above; a hydrophobic component containing an organic hydrophobic diluent and an isocyanate; and an aqueous component containing a water soluble phenolic-aldehyde condensate having free methylol groups and a pH of at least about 8 and being obtained from about 0.75 to about 3.3 moles of aldehyde per mole of phenolic compound.

2. The composition of claim 1 wherein said compound capable of providing reactive methylene sites is hexamethylene tetraamine or trimethylol nitromethane.

3. The composition of claim 1 wherein said compound capable of providing reactive methylene sites is hexamethylene tetraamine.

4. The composition of claim 1 wherein the aqueous component further includes a polymer in addition to said aldehyde condensate.

5. The composition of claim 4 wherein said polymer in addition to said aldehyde condensate contains groups reactive with said isocyanate.

6. The composition of claim 1 which further contains a tertiary amine.

7. The composition of claim 1 wherein said isocyanate compound contains at least two isocyanate groups.

8. The composition of claim 7 wherein said isocyanate is polymeric methylene bisphenyl diisocyanate.

9. The composition of claim 1 wherein said hydrophobic diluent is selected from the group of aliphatic hydrocarbons, aromatic hydrocarbons, cycloaliphatic hydrocarbons, halogenated hydrocarbons, ketones, ethers and esters.

10. The composition of claim 9 wherein said hydrophobic solvent is an aliphatic, cycloaliphatic or aromatic hydrocarbon.

11. The composition of claim 9 wherein said hydrophobic solvent is an aromatic hydrocarbon.

12. The composition of claim 9 wherein the hydrophobic solvent is toluene.

13. The composition of claim 9 wherein said hydrophobic solvent is a diester of phthalic acid.

14. The composition of claim 9 wherein said hydrophobic solvent is dibutyl phthalate.

15. The composition of claim 1 wherein the isocyanate is employed in amounts of about 1 to about 99% by weight based upon the total amount of isocyanate and hydrophobic diluent.

16. The composition of claim 1 wherein the isocyanate is employed in amounts of about 10 to about 90% by weight based upon the total amount of isocyanate and hydrophobic diluent.

17. The composition of claim 1 wherein the isocyanate is employed in amounts of about 50 to about 90% by weight based upon the total amount of isocyanate and hydrophobic diluent.

18. The composition of claim 6 wherein said amine is triethylamine.

19. The composition of claim 1 wherein said phenolic-aldehyde condensate is a phenol-formaldehyde condensate.

20. The composition of claim 1 wherein the phenolic-aldehyde condensate is obtained from about 0.95 to about 3 moles of aldehyde per mole of phenolic compound.

21. The composition of claim 1 wherein the phenolic-aldehyde condensate is obtained from about 1.5 to about 2.5 moles of aldehyde per mole of phenolic compound.

22. The composition of claim 1 wherein said phenolic-aldehyde condensate is prepared under basic conditions employing about 0.25 to about 4% by weight of a basic material based upon the amount of phenolic compound.

23. The composition of claim 1 wherein said phenolic-aldehyde condensate is prepared under basic conditions in the presence of about 0.75 to about 2.5% by weight of a basic material based upon the amount of phenolic compound.

24. The composition of claim 1 wherein said phenolic-aldehyde condensate contains about 3 to about 5% by weight of free phenolic compound.

25. The composition of claim 1 wherein said phenolic-aldehyde condensate is a phenol-formaldehyde condensate prepared in the presence of casein at a pH of about 8.5 to about 9.0.

26. The composition of claim 25 wherein the amount of casein present is from about 0.5 to about 10% by weight based upon the weight of the phenol and formaldehyde.

27. The composition of claim 5 wherein the aldehyde condensate is employed in an amount of about 5 to about 50% by weight; said isocyanate is employed in an amount of about 2 to about 75% by weight; and the polymer which contains groups reactive with said isocyanate is employed in an amount of about 25 to about 90% by weight wherein the above amounts are based upon the total of aldehyde condensate, isocyanate, and the polymer which contains groups reactive with said isocyanate in the composition.

28. The composition of claim 5 which contains from about 0.1 to about 10% by weight of a tertiary amine based upon the total of aldehyde condensate, isocyanate, the polymer which contains groups reactive with said isocyanate and amine.

29. The composition of claim 5 wherein the aldehyde condensate is employed in an amount of about 10 to about 30% by weight, said isocyanate is employed in an amount of about 5 to about 40% by weight; said polymer component which contains groups reactive with said isocyanate is employed in an amount of about 50 to about 85% by weight wherein the above amounts are based upon the total of the phenolic-aldehyde condensate, isocyanate, and polymer reactive with said isocyanate in the composition.

30. The composition of claim 29 which includes a tertiary amine of about 0.1 to about 4% by weight based upon the total of said phenolic-aldehyde condensate, said isocyanate, said amine, and said polymer component which contains groups reactive with said isocyanate.

31. The composition of claim 1, 27, 28, 29 or 30 wherein the amount of said compound capable of providing reactive methylene sites is about 1 to about 20% of weight based upon the weight of said aldehyde condensate.

32. The composition of claim 31 wherein the amount of said compound capable of providing reactive methylene sites is about 5 to about 10% by weight based upon the weight of said aldehyde condensate.

33. The composition of claim 1 wherein the total nonvolatile content is about 10 to about 74% by volume.

34. The composition of claim 1 wherein the total nonvolatile content is about 30 to about 60% by volume.

35. The composition of claim 1 wherein the total nonvolatile content is about 35 to about 55% by volume.

36. The composition of claim 1 wherein the pH of said phenolic-aldehyde condensate is at least about 8.3.

37. The composition of claim 5 which said groups reactive with said isocyanate are selected from the group of hydroxyl, carboxyl, amine, amide or mixtures thereof.

38. The composition of claim 5 wherein said polymer component which contains groups reactive with said isocyanate have an average of at least about two reactive functionalities per polymer chain.

39. The composition of claim 4 or 5 which further contains about 0.1 to about 10 weight percent of a surface-active agent based upon the weight of the polymers present in the aqueous component of the composition.

40. The composition of claim 1 which further includes about 10 to about 50 volume percent of a solid filler based upon the nonvolatiles of the composition.

41. The composition of claim 1 which is substantially free from acid catalysts.

* * * * *